United States Patent Office  2,857,809
Patented Oct. 28, 1958

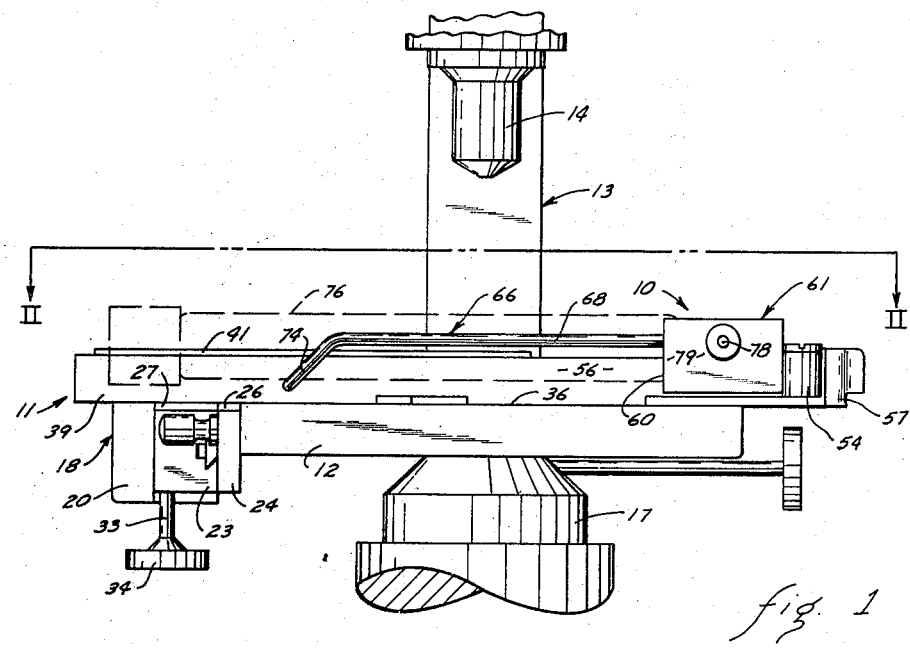

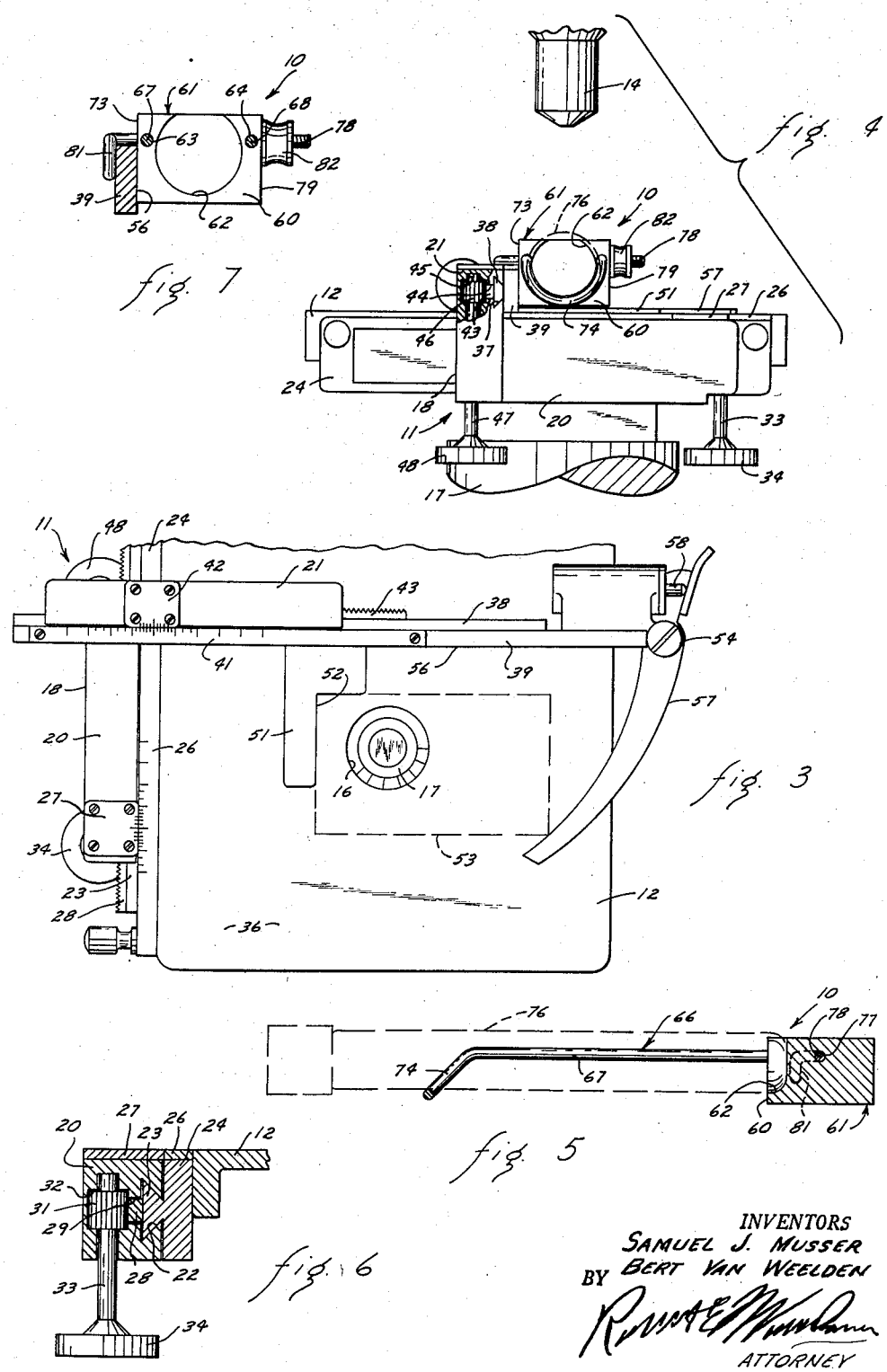

2,857,809

MECHANICAL DEVICE FOR SUPPORTING ARTICLES ON MICROSCOPE STAGE

Samuel J. Musser, Kalamazoo Township, Kalamazoo County, and Bert Van Weelden, Kalamazoo, Mich., assignors to The Upjohn Company, Kalamazoo, Mich., a corporation of Michigan Application July 25, 1957, Serial No. 674,232

7 Claims. (Cl. 88—40)

This invention relates in general to a specimen supporting attachment for a microscope and, more particularly, to an attachment which is removably mountable upon the mechanical stage of a microscope for removably supporting a transparent tube in which said specimen is disposed.

It is a well established practice in the field of medical research to place subjects for examination, such as cultures, in a transparent tube, as a roller tube, where their growth or other action can be observed over relatively long periods of time. Ordinarily a substantial interval of time elapses between the observations, and frequently such observations are conducted concurrently with respect to cultures or other specimens within a large number of similar tubes. It is usually essential to view each culture at a particular point therein in order to obtain the desired information. Thus, unless a given tube is to be left continuously in position under a given microscope, it becomes necessary for any given tube, during successive observations thereof, to be returned for each observation to substantially the same position and attitude with respect to the optics of the microscope. In accomplishing this, it has heretofore been the practice merely to place some type of portable rack upon the microscope stage for the purpose of supporting the specimen containing tubes. Such rack is then manually positioned by trial-and-error within the field of the microscope. Marks are sometimes made upon the surface of the specimen tube in an effort to relocate the initial point of observation. However, particularly in a relatively high powered microscope, such indications can only be approximate at best. Thus, it often become extremely difficult and time-consuming to accurately relocate a particular point of observation. The fact that the specimen may be undergoing changes between observations further compounds the problem in that visual recognition of a given point of observation may become difficult or, if a supposed recognition is not accurate, it may become actually misleading.

Accordingly, a primary object of this invention has been the provision of an attachment for a microscope whereby a tube containing a specimen can be relocated in substantially the same position and attitude with respect to the stage and optics of a microscope during successive observations thereof.

A further object of this invention is the provision of a tube supporting attachment, as aforesaid, which is removably and accurately mountable upon the mechanism of said microscope normally associated with the stage thereof for positioning slides with respect to the field of the microscope.

A further object of this invention is the provision of a tube supporting attachment, as aforesaid, whereby the calibration mechanism associated with the said positioning mechanism of the microscope can be utilized for locating, and after removal again locating, a particular position within said tube with respect to the field of vision of said microscope.

A further object of this invention is the provision of a tube supporting attachment, as aforesaid, which is extremely easy to mount upon said microscope, which can be easily and accurately returned to a given location with respect to the calibrating mechanism on said microscope after a period of temporary removal therefrom, which can be accurately operated by any person capable of operating the microscope, and which is inexpensive to build.

Other objects and purposes of this invention will become apparent to persons acquainted with this type of equipment upon reading the following specification and examining the accompanying drawings in which:

Figure 1 is a fragmentary front elevational of that portion of a microscope including the mechanical stage thereof, with the attachment of the invention supported thereon.

Figure 2 is a sectional view substantially as taken along the line II—II of Figure 1.

Figure 3 is a fragment of Figure 2 with the said attachment removed therefrom.

Figure 4 is an end elevational view of the structure appearing in Figure 1 as viewed from the leftward end thereof.

Figure 5 is a sectional view taken along the line V—V of Figure 2.

Figure 6 is a sectional view taken along the line VI—VI of Figure 2.

Figure 7 is a sectional view taken along the line VII—VII of Figure 2.

For purpose of convenience in description, the terms "upper," "lower" and derivatives thereof will have reference as used herein to the normal operating position of the microscope and parts associated therewith, as appearing in Figures 1 and 4. The terms "left," "right" and derivatives thereof will have reference to the corresponding ends of the structure of, and as appearing in, Figure 1, 2 and 3. The terms "inner," "outer" and derivatives thereof will have reference to the geometric center of the attachment to which this invention relates, as well as the parts of the microscope associated therewith.

General description

In meeting the above objects, there has been provided an attachment comprised of a mounting base upon which an elongated article support element is removably and adjustably secured. Said attachment includes a device for removably securing it to the calibrated specimen positioning mechanism associated with, and mounted upon, the mechanical stage of a microscope. Accordingly, the calibrated positioning mechanism of the microscope can be utilized for positioning said attachment, hence means supported thereon, in a predetermined position.

The attachment is particularly designed to support elongated transparent specimen containing articles. For illustrative purposes, such articles will be assumed herein to be roller tubes, but it will be recognized that a wide variety of other articles can also be handled with little, or no, modification of the device. Further, it will be recognized that the attachment is also capable of supporting elongated opaque articles as a metallurgical samples, where, for example, the point of observation is on the surface of the article.

Detailed description

As shown in Figures 1 and 4, the tube supporting attachment 10, to which this invention relates, is supported upon a calibrated positioning mechanism 11 which is in turn supported upon the mechanical stage 12 of a substantially conventional microscope 13. Said microscope, only part of which is shown, has an objective 14, which is axially aligned with an opening 16 (Figure 2) in the stage 12 and the condenser 17 disposed below the stage 12.

The positioning mechanism 11 (Figures 2, 3 and 4) forms no part of the present invention but will be described in order to present a completely clear disclosure. Said positioning mechanism includes a substantially L-shaped member 18 having legs or beams 20 and 21, which are preferably arranged so that the upper beam 21 crosses over, and is substantially perpendicular to, the lower beam 20. The lower beam 20 (Figure 6) is provided with a lengthwise undercut groove 22 along the inner side thereof, into which a correspondingly shaped, elongated tongue 23 is slidably received. Said tongue 23 is preferably integral with an elongated guide member 24 secured to one lateral edge of the stage 12. A calibrated scale 26 is provided on the upper surface of the guide member 24 adjacent to the beam 20 and parallel with the lengthwise extent thereof. An indicator plate 27 is mounted upon the upper surface of the beam 20 adjacent to the scale 26 (Figures 2 and 3) for indicating the relative position of the beam 20 and stage 12.

A horizontal rack 28 (Figure 6) is mounted upon the outer surface of the tongue 23 and extends into a groove 29 in the inner wall of the groove 22 in said beam 20. The rack 28 is engaged by a pinion 31 rotatably supported within a cavity 32 in the beam 20 near one end thereof. Said pinion 31 is mounted upon a shaft 33 which extends through the lower surface of the beam 20 for rotation manually by a control knob 34. Accordingly, since the rack 28 is fixed with respect to the stage 12 because of its attachment to the guide member 24, rotation of the knob 34, hence the pinion 31, will effect the lengthwise movement of the beam 20 along the edge of the stage 12.

The upper beam 21 (Figures 2 and 3), which is preferably perpendicularly disposed with respect to the beam 20, extends inwardly therefrom across a substantial portion of the upper surface 36 of the stage 12 and closely adjacent thereto. As appearing in Figure 4, the upper beam 21 has a lengthwise, undercut groove 37 in the inner face thereof into which a correspondingly shaped, elongated tongue 38 is slidably received. Said tongue 38 is preferably integral with or secured to an elongated guide bar 39 which is thereby supported upon said beam 21 adjacent to and substantially parallel with said upper surface 36 of the stage 12. Said guide bar 39, which is preferably longer than the width of the stage 12 (Figures 2 and 3), has a scale 41 on its upper surface adjacent to the beam 21. An indicator plate 42 is supported upon the upper surface of the beam 21 adjacent to and cooperable with the scale 41.

A horizontal rack 43 (Figure 3) is supported upon the outer surface of the tongue 38 and is disposed in a groove 43 in the inner wall of the undercut groove 37. The rack 43 is engageable with a pinion 46 (Figure 4) which is rotatably disposed in a cavity 45 in the beam 21 adjacent to the beam 20. The pinion is mounted upon a shaft 47 which extends below said beam 21 where it is connected for rotation by the control knob 48. Accordingly, the pinion 46 effects movement of the rack 43, hence the guide bar 39 to which the rack is secured, lengthwise of the beam 21 and parallel with the upper surface 36 of the stage 12. A flat positioning member 51 (Figures 3 and 4), which is secured to the guide bar 39 parallel with the surface 36, extends away from said guide bar in a direction substantially parallel with the beam 20. Said positioning member has a right angular notch 52 into which one corner of a conventional specimen slide, shown in broken lines at 53 in Figure 3, may be received.

A cylindrical pivot housing 54 (Figures 1 and 3), having a vertical axis, is secured to the rightward end of the guide bar 39 and extends sidewardly past the surface 56 of said guide bar 39. A positioning arm 57 has a shaft, intermediate the ends thereof, which extends upwardly into the pivot housing 54. Said arm 57 is movable along, and adjacent to, the upper surface 36 of the stage 12 for engagement near one end with that corner of a slide 53 (Figure 3), which is diagonally across the slide from the corner disposed within the notch 52. A spring actuated plunger 58, which is supported upon the guide bar 39 adjacent to the pivot housing 54, engages the other end of the positioning arm 57 for urging said arm firmly against said slide 53.

Turning now to the tube supporting attachment 10 (Figures 1 and 2), which constitutes one illustrative and preferred embodiment of the invention, there is provided a substantially rectangular base 61 which is preferably, but not necessarily, fabricated from a solid block of durable material, such as stainless steel. Said base 61 has a substantially circular tube recess 62 in one end 60 thereof. A pair of relatively small recesses 63 and 64 (Figure 7) are provided in said end wall 60 of the base 61 on opposite sides of the tube recess 62. A substantially U-shaped tube support element 66 (Figure 2) has elongated legs 67 and 68 the free ends of which are slidably receivable into the small recesses 63 and 64. Set screws 71 and 72 are threadedly received through the upper surface of the base 61 for engaging and holding said legs 67 and 68, respectively, when they are disposed within said small recesses 63 and 64.

The support element 66 and base 61 (Figure 2) are so arranged and constructed that said legs 67 and 68 are substantially parallel with the lengthwise extent of the guide bar 39 when the side wall 73 of the base 61 is snugly against, and substantially parallel with, the inner surface 56 of the guide bar 39. The outer closed end portion of the support element 66 is bent downwardly, as shown in Figures 1 and 5, to provide a tube cradle 74 of the proper size and specific shape required to cooperate with the tube recess 62 in the adjacent end wall of the base 61 for supporting the article being handled, here the roller tube indicated in broken lines at 76. When said tube is supported by the cradle 74 and base 61, it is preferably disposed parallel with both the guide bar 39 and the upper surface 36 of the stage 12.

The base 61 of the attachment 10 has a rod opening 77 (Figure 5) through which a clamping rod 78 (Figures 2 and 7) is slidably received. The rod opening 77 is preferably substantially perpendicular to and extends through the side wall 73 of the base 61 as well as the opposite side wall 79. Said clamping rod 78 has, as shown in Figures 5 and 7, a substantially L-shaped bent portion 81 on one end thereof. The outer end of said clamping rod 78 is threaded for engagement with a knurled nut 82. The clamping rod 78 and opening 77 are arranged and constructed so that, when the side wall 73 of the base 61 is against the inner surface 56 of the guide bar 39, the bent portion 81 will engage the outer side of the guide bar 39. Thus, by tightening the nut 82, said rod 78 will clamp said guide bar against said base 61 with the attachment 10 in its Figure 1 position, disposed slightly above the surface 36 of the stage 12.

*Operation*

When it becomes desirable to use the microscope 13 for observing the contents of a transparent tube, said microscope can be easily and quickly adapted for such use by mounting the attachment 10 (Figures 1 and 2) upon the positioning mechanism 11. This is accomplished by loosening the nut 82 on the clamping rod 78 until the rightward end portion of the guide bar 39 (Figures 2 and 7) can be received between the side wall 73 of the base 61 and the bent portion 81 of said clamping rod 78. With the side wall 73 of the base 61 firmly and snugly against the adjacent surface 56 of the guide bar 39, the base 61 is moved rightwardly until it engages the pivot housing 54, thereby positively positioning said base 61 with definite reference to the lengthwise extent and the adjacent surface of the guide bar 39. The attachment 10 is then pivoted around the axis of the clamping rod 78 until the legs 67 and 68 of the support element 66 are in a substantially horizontal position. The nut 82 is then tightened against the side wall 79 of the base 61, thereby clamping the guide bar 39 between the bent portion 81 of the rod 78 and the adjacent side wall 73 of said base 61. A tube 76, as a roller tube (Figures 2 and 5), can be supported in the attachment 10 by placing one end thereof in the tube recess 62 of the base 61 and then lowering said tube until it is supported by said cradle 74 at a point spaced from the base 61.

It will be seen that the above described mounting of the attachment 10 upon the positioning mechanism 11 requires nothing to disturb the position or attitude of any of the normal parts or equipment of the microscope 13. This is of particular importance in that even a small change in the parts of a microscope can disturb its adjustment.

Inasmuch as the attachment 10 is mounted upon the positioning mechanism 11 it is possible to use said positioning mechanism in a normal manner for determining and subsequently again finding a given point of observation in a given tube. This is accomplished first by initially turning the control knobs 34 and 48 whereby the L-shaped member 18 is moved with respect to the stage 12 and the guide bar 39 is moved in a transverse direction and with respect to said L-shaped member 18. Since the attachment 10 is mounted upon the guide bar 39, such adjustment of the mechanism 11 will provided a corresponding adjustment in the position of the tube 76, supported in said attachment 10, with respect to the field of vision of the microscope 13.

When the tube 76 has been positioned as desired (Figure 2), a record can then be made of the positions of the scales 26 and 41 indicated by the plates 27 and 42, respectively. Thus, the particular tube disposed in the attachment 10 can be returned precisely to the same position, which it presently occupies, simply by resetting the mechanism 11 according to such record. After the observation with respect to such tube has been completed, it may be easily and quickly lifted out of the attachment and replaced by another tube. If, as is usual, it becomes desirable to observe the second and succeeding tubes in different positions, said tubes will be moved into respective new positions by means of the control knobs 34 and 48 in substantially the same manner as the first tube was moved into its initial position. These new positions can also be accurately and quickly recorded by observing the positions indicated on the scales 26 and 41 by said plates 27 and 42.

Having completed the initial observations with respect to all of the tubes concerned, subsequent observations of desired tubes can be made by placing the desired tube in the attachment 10 and resetting the positioning mechanism 11 by means of the recorded settings for the scales 26 and 41. Since the position of the attachment 10 is definitely referenced with respect to the platform 12 of the microscope, and the position of a given tube is definitely referenced with respect to the attachment 10, the tube can be repeatedly removed from and restored to, a given position with respect to the optical axis of the microscope. Accordingly, the point of observation in the roller tube originally examined will be automatically returned to the same position with respect to the field of vision of the microscope.

When a set of observations involving the tubes has been completed, the attachment 10 can be quickly and easily removed from the positioning mechanism 11 by loosening the nut 82 and lifting said attachment 10 away from the guide bar 39, thereby returning the microscope to condition for use in a conventional manner with slides. Accordingly, the change over from the slide observing function of the microscope to the tube observing function thereof and back again, by means of the attachment 10, can be made accurately and quickly without altering the effectiveness of the microscope with respect to either function.

Although a preferred embodiment of the invention has been disclosed herein for illustrative purposes, it will be understood that variations or modifications thereof which do not depart from the scope of the invention are fully contemplated unless specifically stated to the contrary in the appended claims.

We claim:

1. A device for supporting an article upon, and for movement by, the specimen positioning mechanism of a microscope, said mechanism having a reference surface, comprising: a base member engageable with said surface; means associated with said base member for removably fixing said member in a predeterminable position with reference to said surface and with respect to said mechanism; a support element secured to, and extending from, said base member; and means on said base member cooperable with said support element for supporting a said article in a selected position with respect to said base member.

2. A device for supporting and locating an article with respect to the specimen positioning mechanism of a microscope, said mechanism having a reference surface and reference means fixed with respect to said surface, comprising: a base member having a reference wall engageable with said reference surface when said member is engaged with said reference means; a clamping member secured to said base member for engaging said mechanism and releasably holding said reference wall against said surface; a support element secured to, and extending from one end of, said base member; and means on said base member for supporting one end of said article in a predetermined position with respect to said base member, said article being supported near its other end by said support element.

3. A device for supporting and locating a tube with respect to the specimen positioning mechanism of a microscope, said mechanism including a guide bar having a reference surface on one side and a reference element at one end of said surface, comprising: a base member having a reference side wall engageable with said reference surface when said base member is against said reference element; a holding member secured to said base member for engaging said guide bar and releasably holding said side wall fixed with respect to said surface; a U-shaped support element having elongated legs, the free ends thereof being secured to one end of said base member; and a recess in said end of said base member for receiving and supporting one end of a said tube and for referencing its position with respect to said base member, said tube being supported near the other end thereof by the closed end of said support element.

4. For use with a microscope having a stage and a specimen positioning mechanism adjustably supported upon said stage, said mechanism including a guide bar disposed substantially parallel with said stage, said guide bar having a planar surface on one side thereof and a stop element at one edge of said surface, a device for supporting and locating a tube with respect to said positioning mechanism comprising: a base member having a planar side wall engageable with said planar surface when said base member is against said stop element; a clamping member secured to said base member for engaging said guide bar and releasably holding said side wall firmly against and parallel with said surface; a U-shaped support element having elongated legs, the free ends thereof being secured to one end of said base member, said legs being substantially parallel with the lengthwise extent of said guide bar when said base member is secured thereto; a recess in said end of said base member for receiving and supporting one end of a tube, when said tube is being supported near the other end thereof by the closed end of said support element.

5. The structure of claim 4 wherein a portion of said support element adjacent to thte closed end thereof is bent downwardly out of the substantially horizontal plane defined by the legs of said element to provide a cradle for said tube.

6. An attachment for supporting a tube upon the specimen positioning mechanism of a microscope, the combination comprising: a substantially rectangular base member having a planar side wall and an opening extending through said base member substantially perpendicular to said side wall; a clamping rod slidably disposed within said opening and extending from both ends thereof, one end of said rod being threaded and the other end of said rod being bent substantially at right angles to the lengthwise extent of said rod; a nut engageable with said threaded end; a U-shaped support element having a web portion and elongated substantially parallel legs extending substantially equidistantly from said web; means defining a pair of recesses in said base member for snugly and slidably receiving the free ends of said legs, the axes of said leg recesses being substantially perpendicular to the axis of said rod opening; means releasably holding said legs within said leg recesses; and a circular tube recess disposed within said base member between said leg recesses and having an axis substantially parallel with the axes of said leg recesses.

7. The structure of claim 6 wherein said web portion and adjacent portions of said legs are bent out of a plane defined by the said legs to form a cradle for said tube.

No references cited.